United States Patent
Wilson

(10) Patent No.: US 10,865,939 B1
(45) Date of Patent: Dec. 15, 2020

(54) ADJUSTABLE WINCH HANGER

(71) Applicant: Johnathan F. Wilson, Gainesville, FL (US)

(72) Inventor: Johnathan F. Wilson, Gainesville, FL (US)

( * ) Notice: Subject to any disclaimer, the term of this patent is extended or adjusted under 35 U.S.C. 154(b) by 0 days.

(21) Appl. No.: 16/800,936

(22) Filed: Feb. 25, 2020

(51) Int. Cl.
| | |
|---|---|
| F16L 1/00 | (2006.01) |
| B66C 1/00 | (2006.01) |
| B66C 1/10 | (2006.01) |
| B66D 3/26 | (2006.01) |
| B63B 27/10 | (2006.01) |
| F16M 13/00 | (2006.01) |
| F16M 13/02 | (2006.01) |
| F16L 1/20 | (2006.01) |
| B66D 1/56 | (2006.01) |
| F16L 1/235 | (2006.01) |

(52) U.S. Cl.
CPC ........... *F16M 13/022* (2013.01); *F16L 1/00* (2013.01); *B66D 1/56* (2013.01); *F16L 1/207* (2013.01); *F16L 1/235* (2013.01)

(58) Field of Classification Search
CPC .......... F16M 13/022; F16L 1/00; F16L 1/207; F16L 1/235; B66C 1/00; B66D 1/56
See application file for complete search history.

(56) References Cited

U.S. PATENT DOCUMENTS

| | | | | |
|---|---|---|---|---|
| 2,096,600 A | * | 10/1937 | Vandervoort | ........... E21B 19/14 414/22.63 |
| 2,335,571 A | | 11/1943 | Schroeder | |
| 2,778,506 A | | 1/1957 | Harry | |
| 2,829,929 A | * | 4/1958 | Wardell | ..................... E04G 5/00 182/13 |
| 3,561,615 A | * | 2/1971 | Forsberg | ................... F16L 1/09 29/237 |
| 4,132,317 A | * | 1/1979 | Arendt | .................... B66C 23/76 180/9.48 |
| 4,290,584 A | * | 9/1981 | Eckels | ..................... B66D 1/08 242/390.8 |

(Continued)

FOREIGN PATENT DOCUMENTS

| | | |
|---|---|---|
| EP | 0692447 A1 | 3/2001 |
| WO | WO2015075238 A1 | 5/2015 |

OTHER PUBLICATIONS

"OZ LiftingOBH-230 Mounting Arm Bracket", https://www.toolfetch.com/material-handling/hoisting-rigging/electric-chain-hoist/100-1000-lb-electric/oz-lifting-obh-230-mounting-arm-bracket-for-obh-500.html.

*Primary Examiner* — Tan Le

(57) ABSTRACT

An adjustable winch hanger is provided to mount and support a winch in midair or another location in order to lift objects such as pipes or the like to an appropriate height for installation. A plurality of bolt-receiving channels are connected to a main body and oriented laterally. A plurality of bolts, wedge bolts in particular, are positioned into the bolt-receiving channels. A rod channel runs vertically through the bolt-receiving channels to receive a vertically-oriented rod to which to affix the winch hanger. A tightening mechanism is engaged with the plurality of bolts and configured to axially displace the bolts within the bolt-receiving channels in order to tighten the bolts against the vertically-oriented rod. A center bolt is threadedly engaged with a threaded collar, which is connected to a tie bar, which is connected to the plurality of wedge bolts, ensuring the wedge bolts are laterally aligned with each other.

17 Claims, 12 Drawing Sheets

(56) References Cited

U.S. PATENT DOCUMENTS

| | | | | | |
|---|---|---|---|---|---|
| 4,964,606 | A | * | 10/1990 | Beam | F16M 11/14 |
| | | | | | 248/188.5 |
| 5,310,152 | A | * | 5/1994 | O'Neill | A47B 81/06 |
| | | | | | 248/324 |
| 5,551,658 | A | * | 9/1996 | Dittmer | G03B 21/00 |
| | | | | | 248/329 |
| 2013/0213920 | A1 | * | 8/2013 | Oliver | B60R 9/00 |
| | | | | | 212/302 |

* cited by examiner

ADJUSTABLE WINCH HANGER

FIELD OF THE INVENTION

The present invention relates generally to lifting machinery. More particularly, the present invention relates to an apparatus for supporting a winch.

BACKGROUND OF THE INVENTION

In industry, piping is a system of pipes used to convey fluids (liquids and gases) from one location to another. The desired location for any given pipe in a system may vary, and it often advantageous for one reason or another to install pipes in an elevated position, such as near a ceiling.

One current means of installing a pipe in an elevated position is to use a clevis hanger. A clevis hanger is a pipe attachment providing vertical adjustment, consisting of a clevis type top bolted to a formed steel bottom strap. They are recommended for the suspension of non-insulated, stationary pipe lines. By their nature, clevis hangers must be suspended from an anchoring point in order to hold a pipe.

In order to install pipes in elevated positions, pipe sections must somehow be raised from ground level to the desired height; however, this can pose a problem for workers if the pipe to be lifted is very heavy. Currently, most piping is lifted through means such as chainfalls and comealongs, which provide the necessary mechanical advantage to a worker in their effort to raise a pipe to the desired level. However, these devices require much physical exertion to operate, and rely on being anchored to an overhead point, or deck, which often requires drilling. Clevis hangers, however, may already be installed into the overhead deck.

It is therefore an objective of the present invention to provide a "clevis crane" that can attach and dock itself to an existing hanging clevis hanger, eliminating the need for chainfalls, come alongs, or any device that requires drilling the above deck for anchorage. The present invention may be mounted in an elevated position to the support rod for a clevis hanger, and the present invention may further support a winch, which may then be used to raise a pipe to the elevated position. After the raised pipe is installed, the present invention may be unmounted from the first clevis hanger and moved to a new clevis hanger to raise another section of pipe. The present invention is an easily mountable and removable platform for supporting a winch for raising sections of pipe to an elevated installation location.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
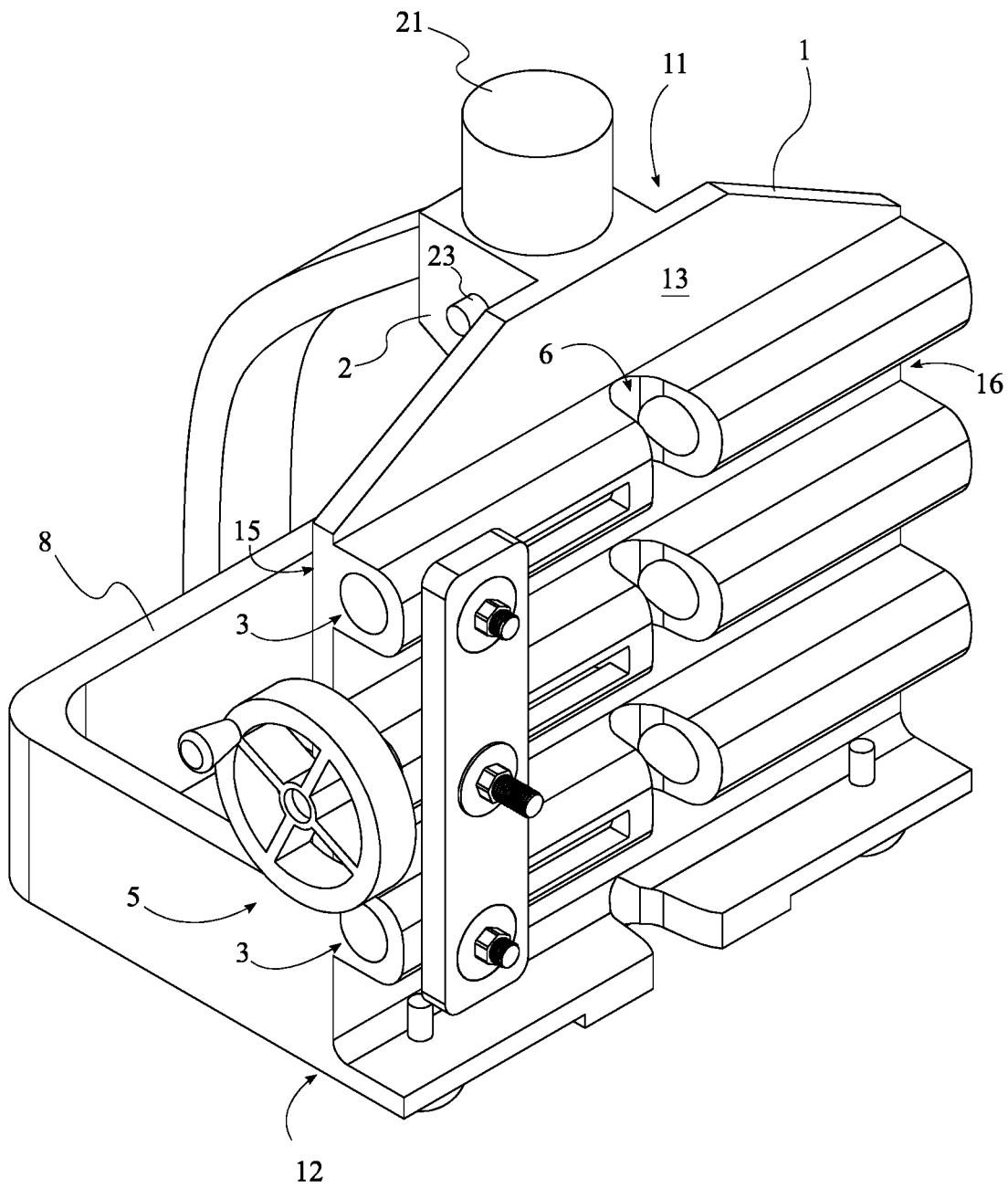
FIG. 1 is a front perspective view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is an adjustable hanger for suspending a winch in mid-air. In general, referring to FIGS. 1-5, the present invention comprises a main body 1, a hanger connection 2, a plurality of bolt-receiving channels 3, a plurality of bolts 4, a tightening mechanism 5, and a rod channel 6. The present invention is used to support a winch in order to lift pipes or other items to an elevated position for installation.

The main body 1 is the primary structural component of the present invention to which the remaining components are connected and positioned relative. It may be understood that the specific geometry of the main body 1 may vary in various embodiments; however, in the preferred embodiment of the present invention, the main body 1 is a generally planar body extending vertically between a top end 11 and a bottom end 12, longitudinally between a front side 13 and a back side 14, and laterally between a first lateral side 15 and a second lateral side 16. The front side 13 and the back side 14 occupy the majority of the surface area of the main body 1, such that the generally planar shape of the main body 1 extends vertically and laterally.

The hanger connection 2 facilitates suspension of the present invention from a ceiling truss, pipe, or other structural element. The hanger connection 2 is connected adjacent to the top end 11 of the main body 1.

Each of the plurality of bolt-receiving channels 3 is an elongated, generally tubular member intended to receive one of the plurality of bolts 4 or similar elements. The plurality of bolt-receiving channels 3 is connected to the front side 13 of the main body 1, each of the plurality of bolt-receiving channels 3 is oriented laterally and parallel to each other, and the plurality of bolt-receiving channels 3 is linearly distributed along the front side 13 between the top end 11 and the bottom end 12.

Each of the plurality of bolts 4 is positioned into one of the plurality of bolt-receiving channels 3 adjacent to one of the lateral ends of the main body 1; more specifically, each of the plurality of bolts 4 is positioned into the one of the plurality of bolt-receiving channels 3 adjacent to the first lateral side 15. However, it may be noted that in general, the present invention may be laterally mirrored to no substantial or functional effect.

The rod channel 6 traverses vertically and laterally centrally through the plurality of bolt-receiving channels 3 adjacent to the front side 13. During use, the rod channel 6 is intended to receive a vertically-oriented rod in order to adequately position and secure the present invention in place. More specifically, the aforementioned vertically-oriented rod is typically an "all thread" rod.

Figure 8:
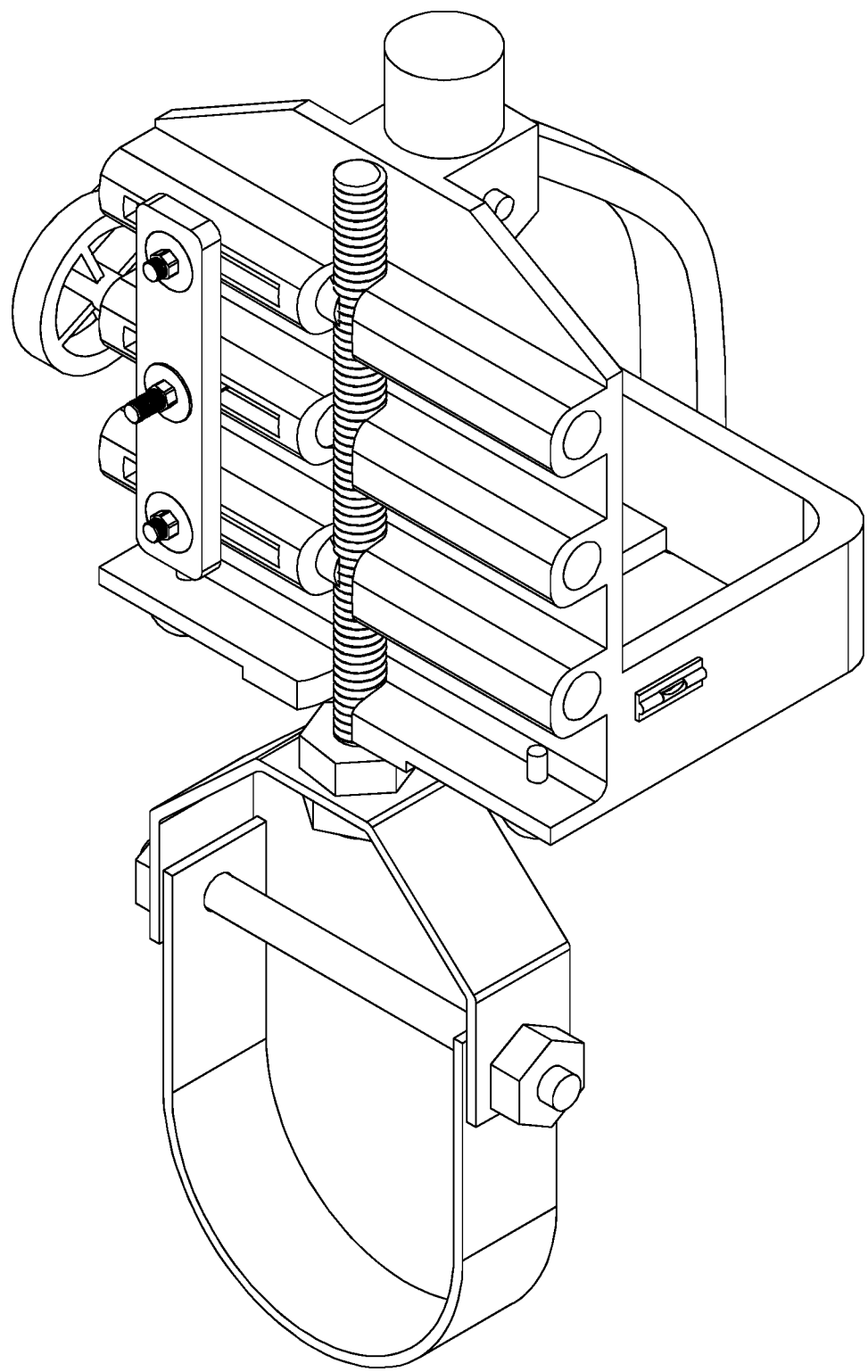
FIG. 8 is an illustration of the present invention mounted to a vertically-oriented rod.

The tightening mechanism 5 is engaged with the plurality of bolts 4 such that the tightening mechanism 5 is configured to axially displace the plurality of bolts 4 within the plurality of bolt-receiving channels 3, and wherein the plurality of bolts 4 is laterally aligned with each other through the tightening mechanism 5. In general, the tightening mechanism 5 is intended to displace the plurality of bolts 4 laterally inward within the plurality of bolt-receiving channels 3 in order to press the plurality of bolts 4 against the vertically-oriented rod positioned within the rod channel 6, thus securing the present invention against rotation and lateral displacement during use. FIG. 8 illustrates the present invention in use with the plurality of bolts 4 tightened against a vertically-oriented rod of a clevis hanger.

In some embodiments, the present invention may further comprise a retaining cuff 8. The retaining cuff 8 is connected between the first lateral side 15 and the second lateral side 16 of the main body 1, and extends longitudinally outward from the back side 14 in a generally rectangular shape, wherein a retaining space is delineated between the retaining cuff 8 and the main body 1. The retaining cuff 8 traverses upward from the bottom end 12 of the main body 1 approximately one quarter to one third of the height of the main body 1 toward the top end 11, though this may vary in different embodiments. The retaining cuff 8 may further serve to balance the center of mass of the present invention and provide a supporting structure upon which to place a winch during use of the present invention.

Additionally, the present invention may further comprise a support member 9 connected between the retaining cuff 8 and the hanger connection 2, the support member 9 being laterally positioned equidistantly between the first lateral side 15 and the second lateral side 16 of the main body 1. The support member 9 provides structural support to the present invention in addition to serving as a carrying handle for a user to manually transport the present invention.

Figure 4:
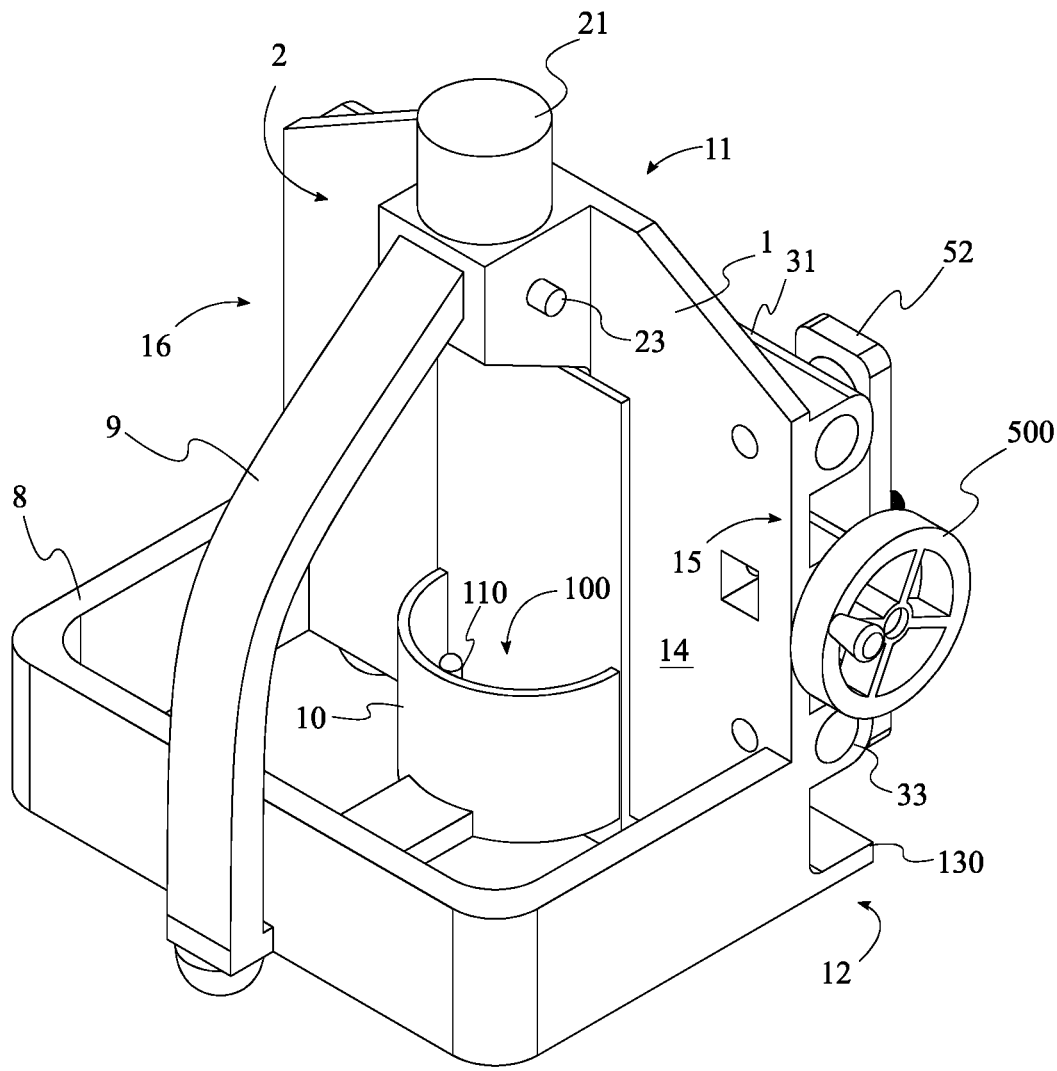
FIG. 4 is a back perspective view of the present invention.
Figure 9:
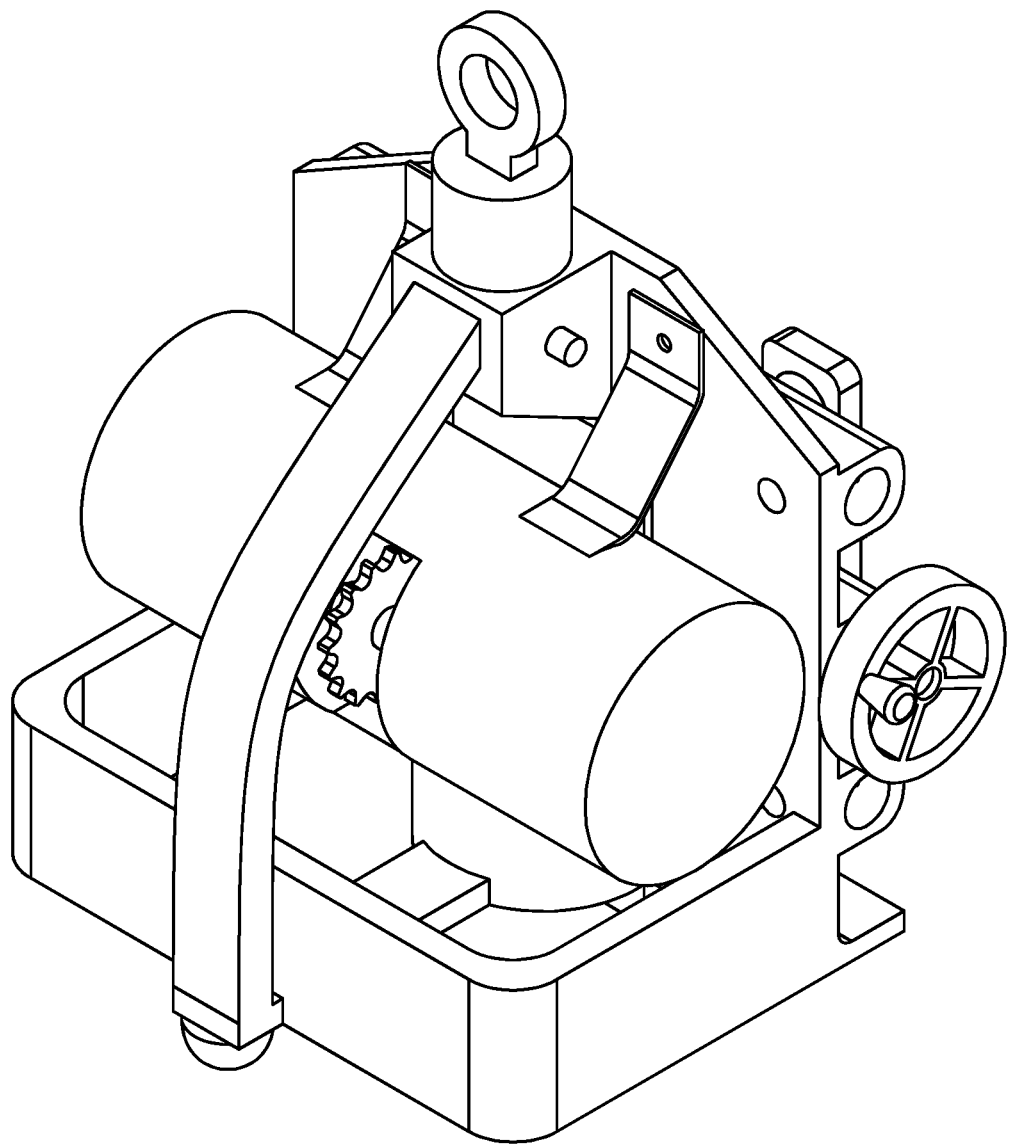
FIG. 9 is an illustration of a winch being connected to the main body of the present invention.

As previously mentioned, the intent of the present invention is to suspend or otherwise position a winch or other mechanism or item in mid-air or another desirable location. During use, the winch will be connected, attached or otherwise placed against the back side 14 of the main body 1, atop the retaining cuff 8, with the chain, rope or other pulling element of the winch hanging downward through the retaining cuff 8, as illustrated in FIG. 9. Additionally, the preferred embodiment further comprises chain retaining barrier 10 that is connected to the back side 14 of the main body 1 adjacent to the bottom end 12, as shown in FIG. 4. The chain retaining barrier 10 extends longitudinally outward from the back side 14 of the main body 1, such that a chain dropway 100 is delineated between the chain retaining barrier 10 and the main body 1. During use, the chain will be positioned through the chain dropway 100 in order to lift a pipe or other item upward to a position just below the present invention. Furthermore, in the preferred embodiment, the chain retaining barrier 10 is laterally centered between the first lateral side 15 and the second lateral side 16 of the main body 1, though this position may vary in different embodiments. Moreover, in the preferred embodiment, the chain retaining barrier 10 is semi-circular in shape, though this may also vary in different embodiments. In addition, a connecting element may be longitudinally connected between the chain retaining barrier 10 and the retaining cuff 8 to provide additional structural support to the present invention. The preferred embodiment of the present invention may also further comprise a laser channel 110 that is internally connected to the chain retaining barrier 10, longitudinally opposite the main body 1 along the chain retaining barrier 10. The laser channel 110 is oriented vertically, and may be configured to receive a handheld laser pointer, or may have a permanently integrated laser emitter. The purpose of utilizing a laser in the present invention is to properly align the present invention above an item to be lifted through the use of the supported winch.

Figure 10:
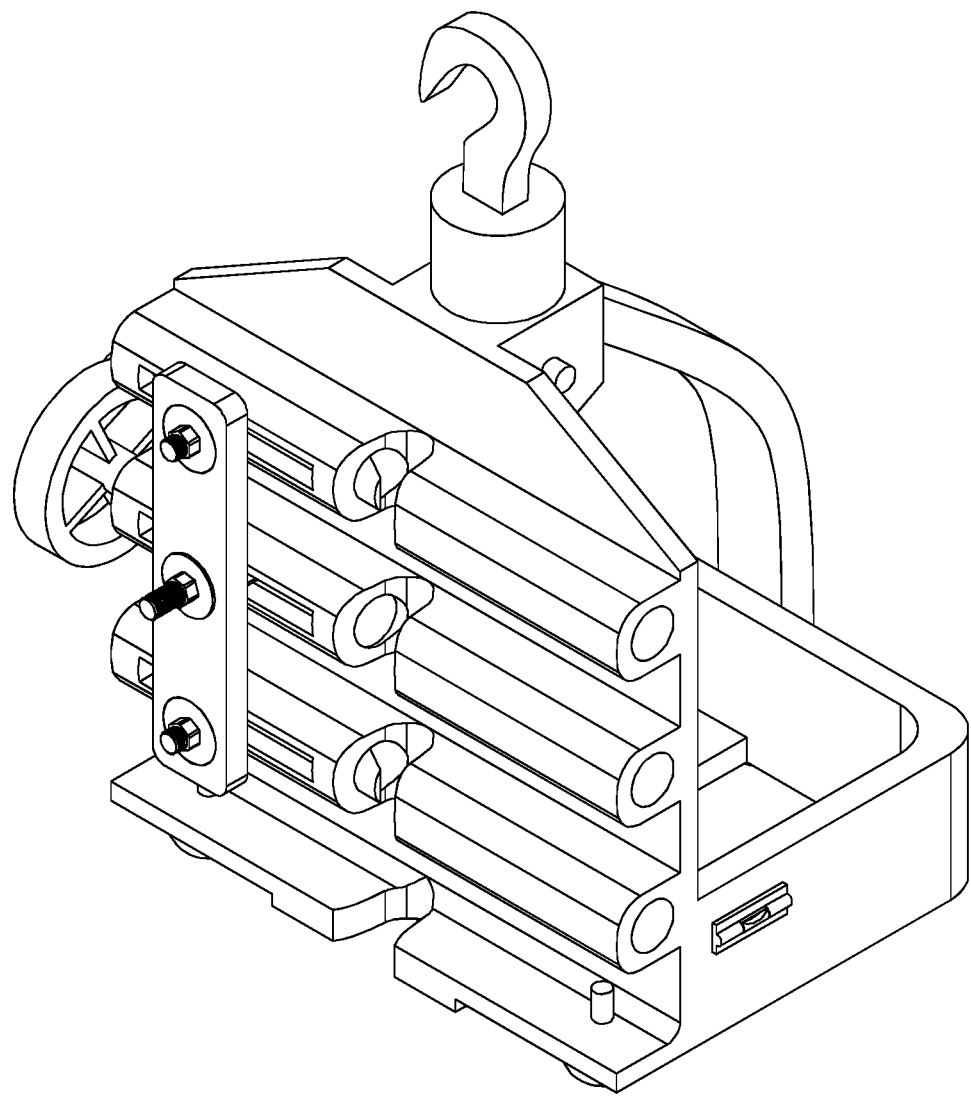
FIG. 10 is an illustration of one embodiment of the present invention wherein the anchor insert comprises a clevis hook connection.
Figure 11:
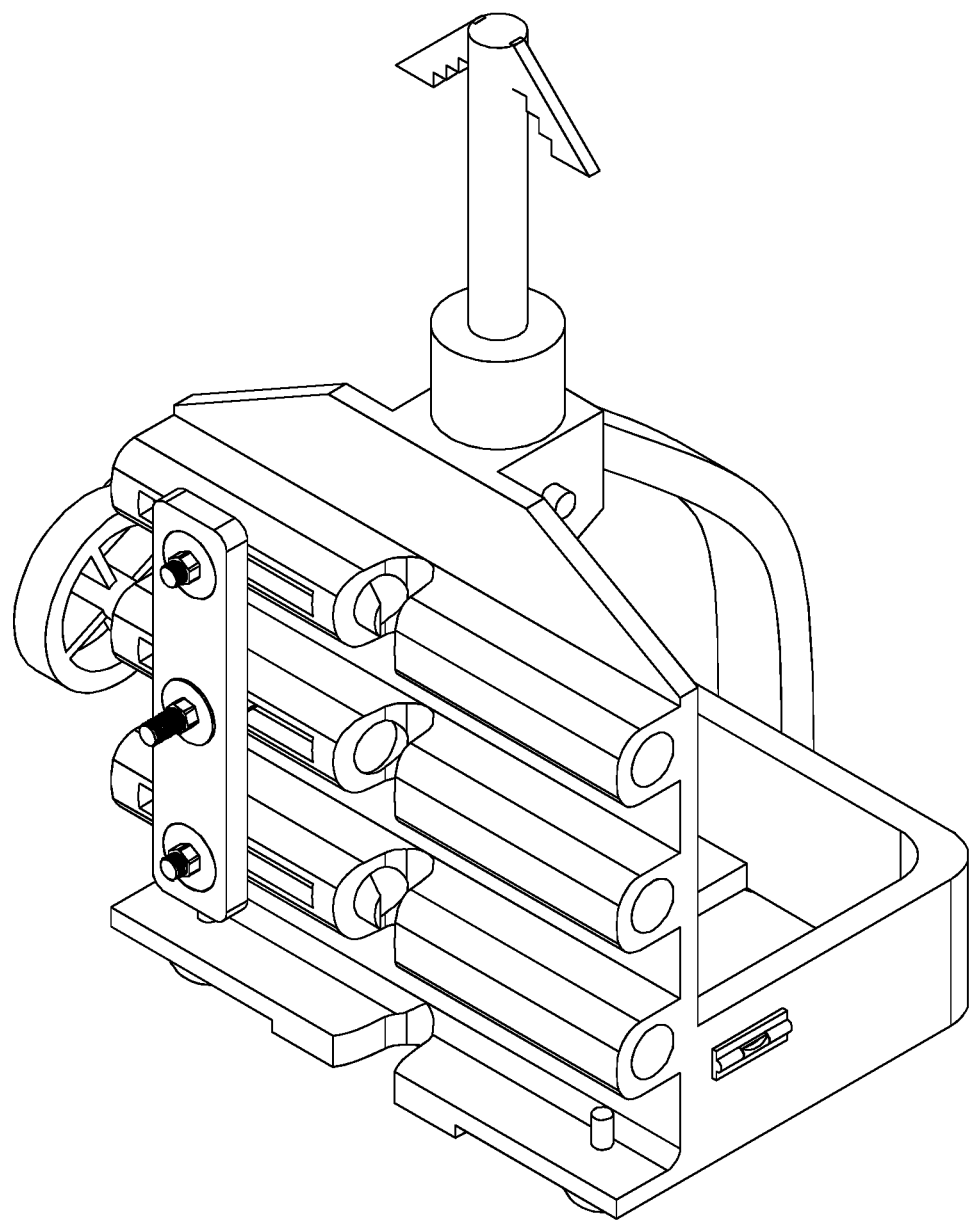
FIG. 11 is an illustration of one embodiment of the present invention wherein the anchor insert comprises a bar joist hook connection.
Figure 12:
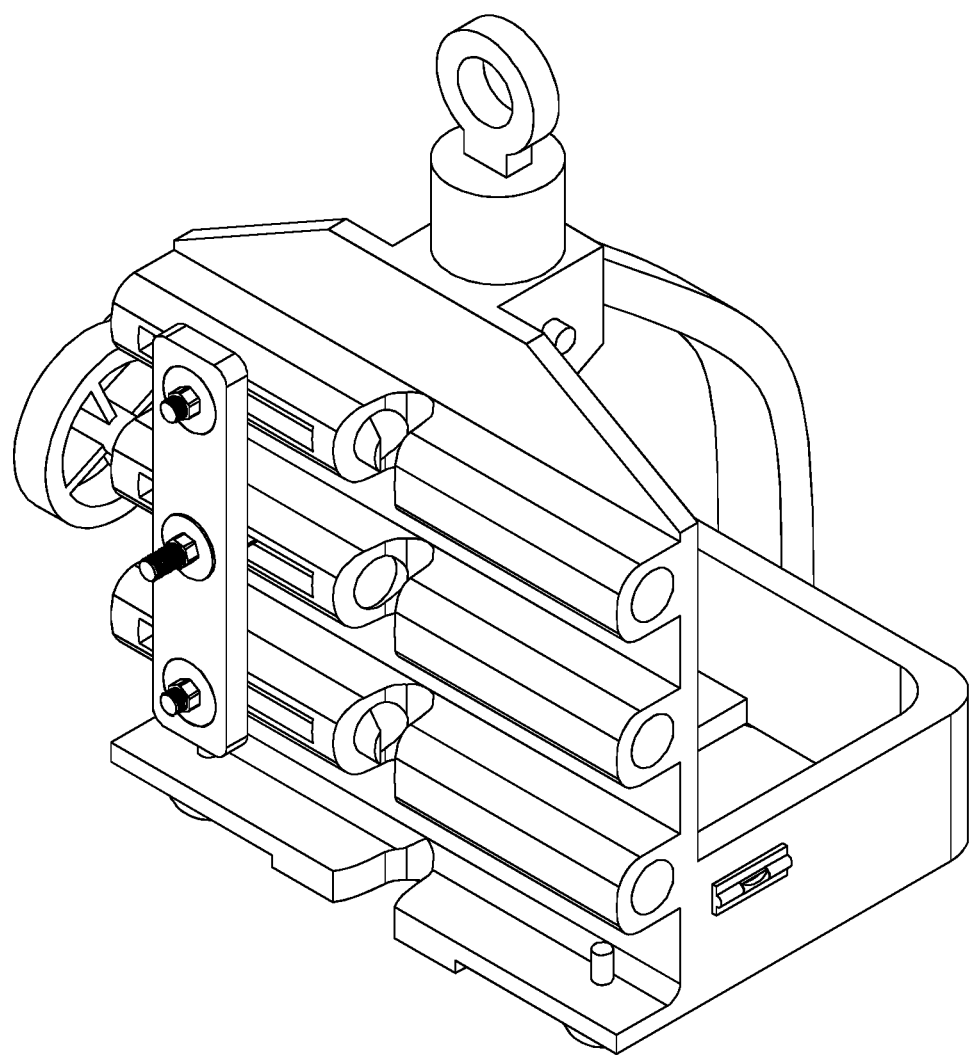
FIG. 12 is an illustration of one embodiment of the present invention wherein the anchor insert comprises a ring connection.

As previously mentioned, the hanger connection 2 allows the present invention to be hung from a ceiling, pipe, duct, or any other solid affixing point. In the preferred embodiment, the hanger connection 2 is connected to the back side 14 of the main body 1, though the specific position of the hanger connection 2 may vary in different embodiments. In some embodiments, the hanger connection 2 may be permanently affixed to the main body 1. However, in the preferred embodiment of the present invention, the hanger connection 2 allows for various means of hanging the present invention. As such, the present invention further comprises an anchor insert 21, while the hanger connection 2 comprises an insert recess. The insert recess vertically traverses into the hanger connection 2, and the anchor insert 21 is removably affixed within the hanger connection 2. More specifically, in the preferred embodiment the hanger connection 2 takes the form of a generally solid block within which the insert recess is cut. The insert recess may have varying geometries, but in the preferred embodiment the insert recess is cylindrical. The anchor insert 21 is shaped to match the geometry of the insert recess; thus, the anchor insert 21 comprises a cylindrical insert portion in the preferred embodiment, which is placed into the insert recess. In various embodiments, the means through which the anchor insert 21 is removably affixed within the insert recess may vary. In some embodiments, the anchor insert 21 is affixed within the insert recess through a pin fastener. As such, the hanger connection 2 may comprise a lateral pin hole 22 which traverses through the hanger connection 2 into the insert recess, while the anchor insert 21 comprises its own pin hole 22. The pin hole 22 of the anchor insert 21 is aligned with the pin hole 22 of the hanger connection 2, and a pin 23 is inserted through the pin holes 22 of both the hanger connection 2 and the anchor insert 21, thus affixing the anchor insert 21 within the hanger connection 2. As such, various connection types may be utilized at will to hang the present invention. In some embodiments, the anchor insert 21 may comprise a clevis hook connection which may be secured around a compatible fixture, as illustrated in FIG. 10. In some embodiments as illustrated in FIG. 11, the anchor insert 21 may comprise a joist hook connection. In some embodiments as illustrated in FIG. 12, the anchor insert 21 may comprise a ring connection. In any case, the anchor insert 21 may be swapped out at the discretion of the user in order to utilize any desired hanging connection as the anchor insert 21.

Figure 5:
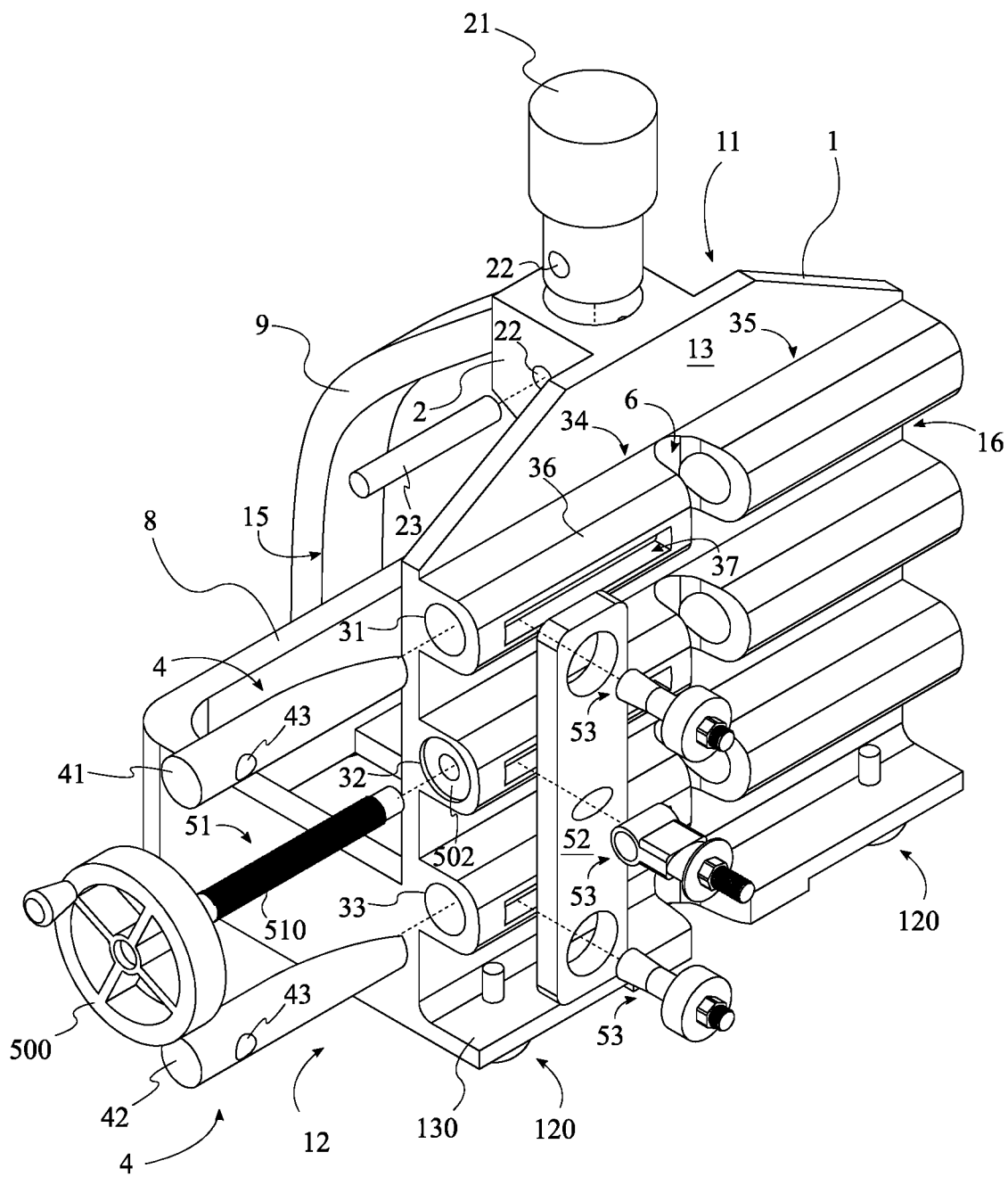
FIG. 5 is a front perspective view of the present invention in an exploded state.

Referring to FIG. 5, in the preferred embodiment, the plurality of bolts 4 comprises a first wedge bolt 41 and a second wedge bolt 42, while the tightening mechanism 5 comprises a center bolt 51. Furthermore, in the preferred embodiment, the plurality of bolt-receiving channels 3 comprises a top bolt-receiving channel 31, a center bolt 51-receiving channel 32, and a bottom bolt-receiving channel 33. The top bolt-receiving channel 31 is positioned between the center bolt 51-receiving channel 32 and the top end 11 of the main body 1, while the bottom bolt-receiving channel 33 is positioned between the center bolt 51-receiving channel 32 and the bottom end 12 of the main body 1 and the center bolt 51-receiving channel 32 is positioned between the top bolt-receiving channel 31 and the bottom bolt-receiving channel 33. The first wedge bolt 41 is positioned within the top bolt-receiving channel 31, the center bolt 51 is positioned within the center bolt 51-receiving channel 32, and the second wedge bolt 42 is positioned within the bottom bolt-receiving channel 33.

In the preferred embodiment, each of the plurality of bolt-receiving channels 3 comprises a first channel portion 34 and a second channel portion 35. The first channel portion 34 is positioned adjacent to the first lateral side 15, and the second channel portion 35 is positioned adjacent to the second lateral side 16, with the first channel portion 34 and the second channel portion 35 being laterally separated by the rod channel 6 for each of the plurality of bolt-receiving channels 3. The first channel portion 34 and the second channel portion 35 are axially aligned with each other. It may be noted that the second channel portion 35 does not necessarily need to be configured to accommodate one of the plurality of bolts 4. This is because, as previously mentioned, the purpose of the tightening mechanism 5 is to tighten the plurality of bolts 4 against the aforementioned vertically-oriented rod to be placed within the rod channel 6. The second channel portion 35 simply needs to act as a solid element against which the vertically-oriented rod may be compressed by the plurality of bolts 4 within the rod channel 6.

Figure 7:
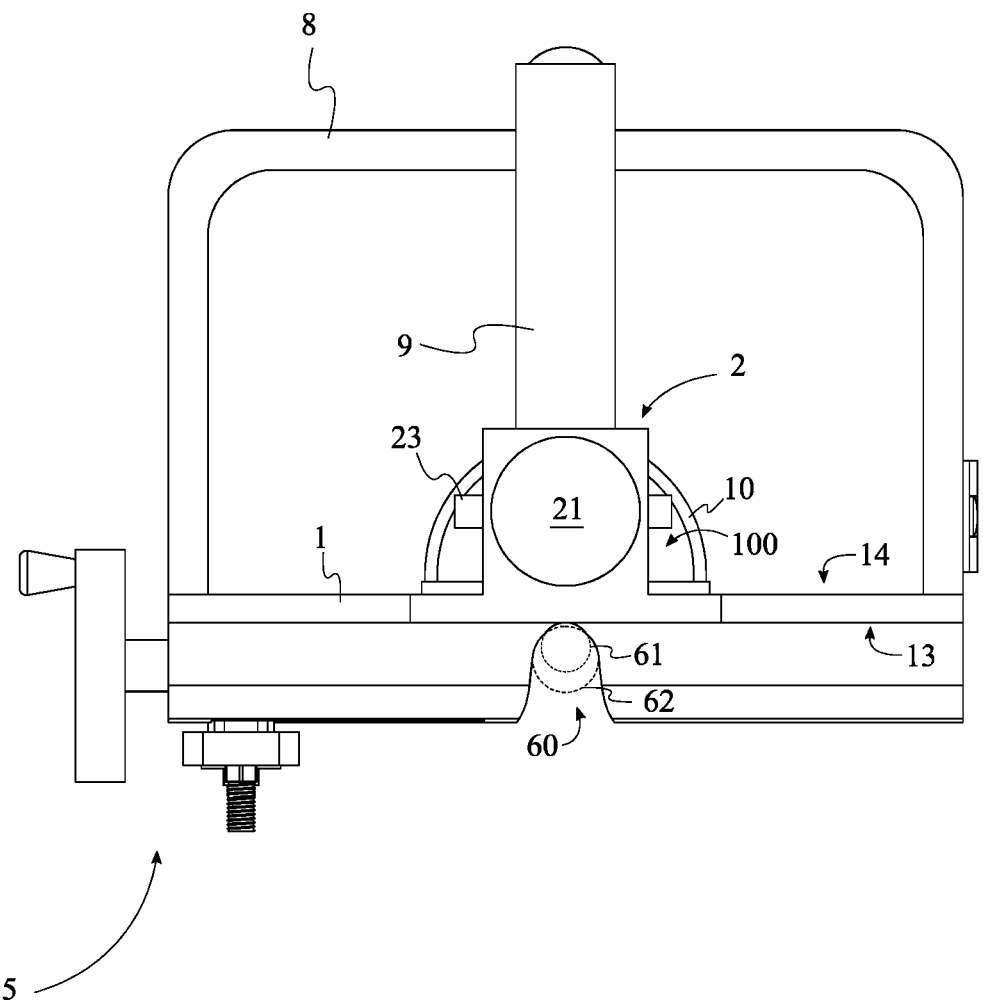
FIG. 7 is a top view of the present invention.

Preferably, the rod channel 6 is designed to accommodate multiple diameters of rods in order to be widely applicable. As such, in the preferred embodiment, the rod channel 6 is delineated by at least one circle 60, as shown in FIG. 7. More particularly, a first circle 61 from the at least one circle 60 is positioned tangent or approximately so to the front side 13 of the main body 1. A second circle 62 from the at least one circle 60 is larger in diameter than the first circle 61, and a center of the first circle 61 is positioned between a center of the second circle 62 and the front side 13 of the main body 1. Thus, the rod channel 6 may be configured to accommodate multiple rod diameters by delineating the rod channel 6 through multiple such circles.

Figure 2:
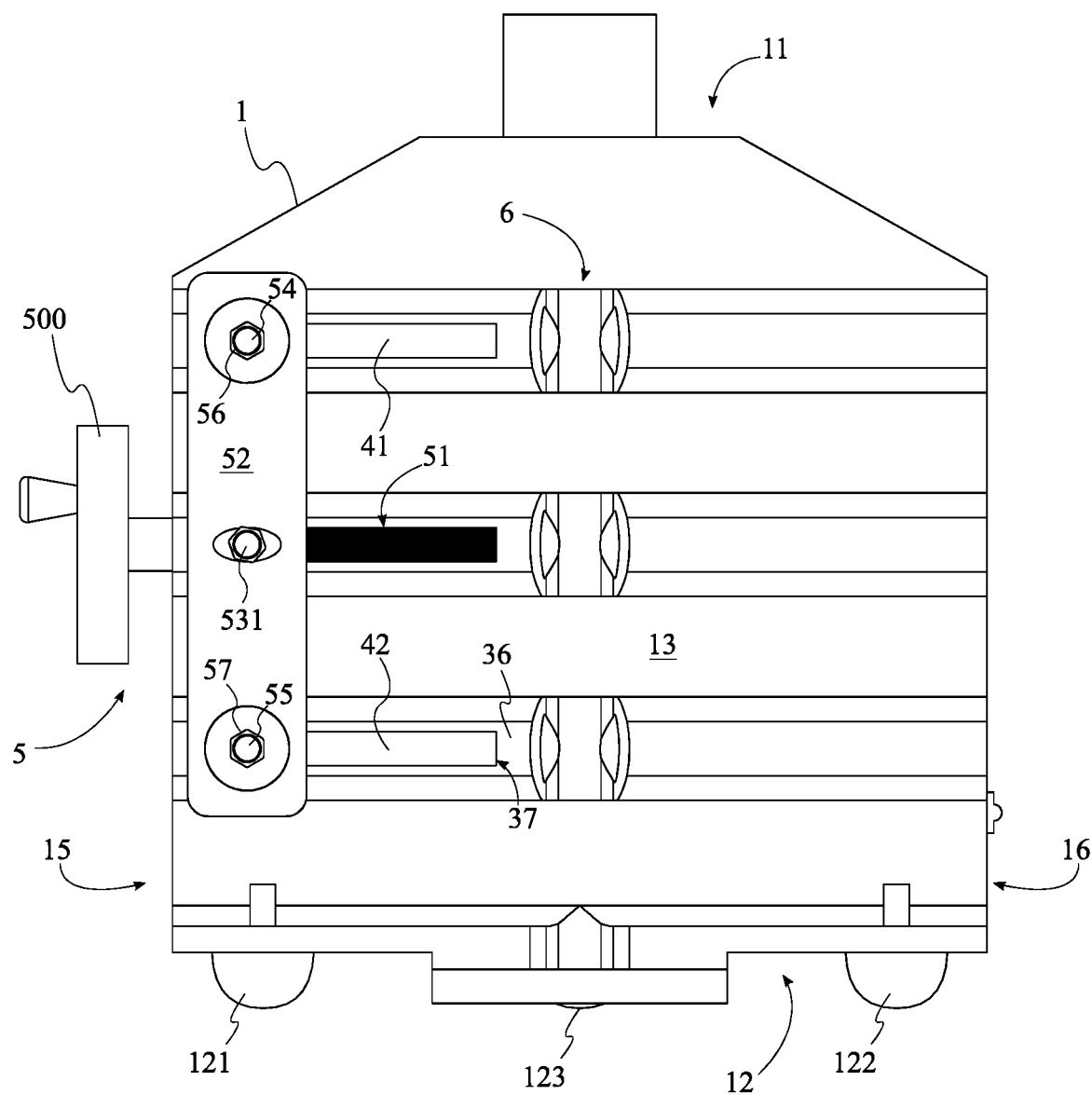
FIG. 2 is a front view of the present invention.
Figure 3:
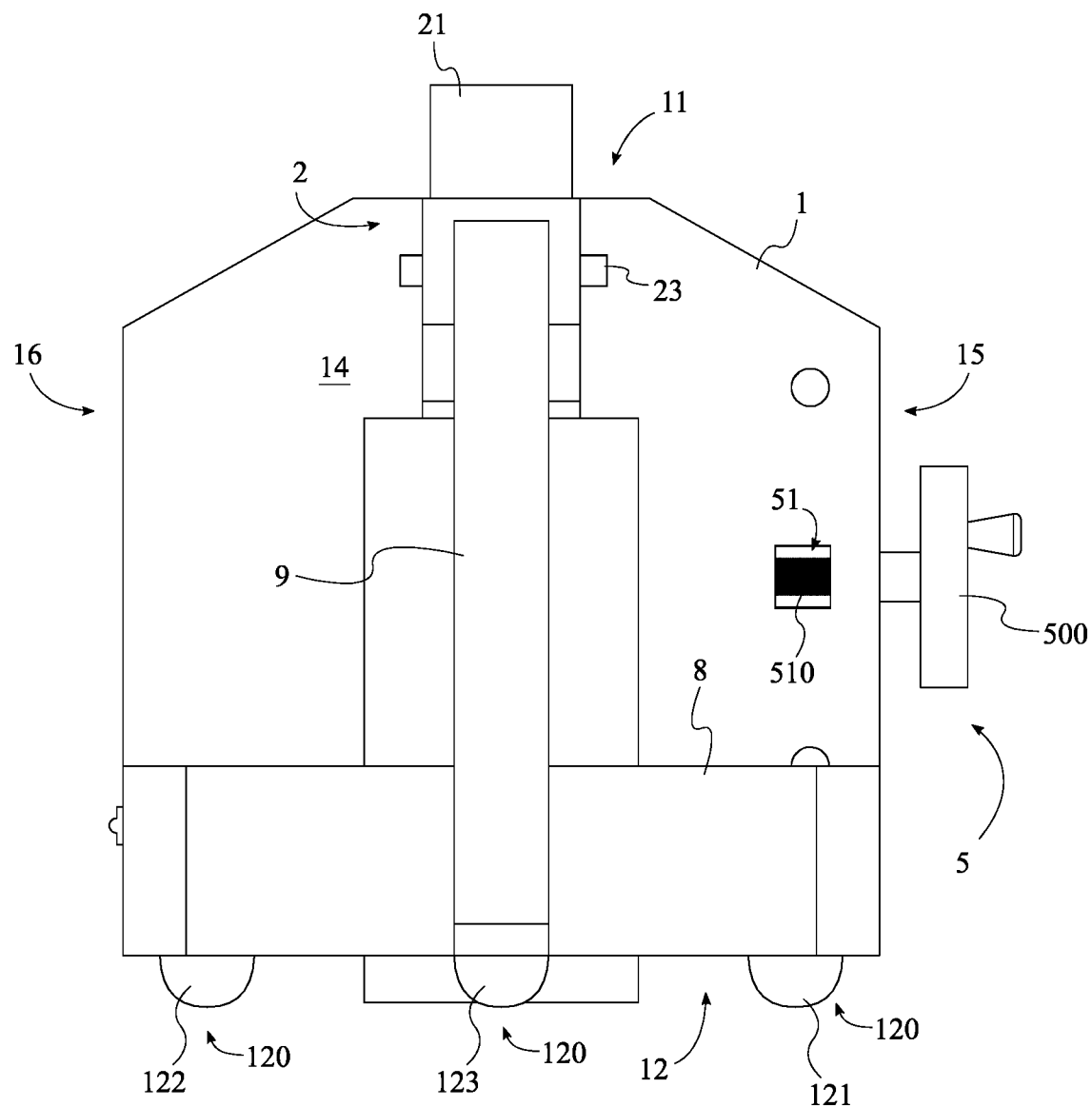
FIG. 3 is a back view of the present invention.

Referring to FIGS. 2 and 5, in the preferred embodiment of the present invention, the tightening mechanism 5 comprises a tie bar 52 and a plurality of bolt-connecting members 53. Further, each of the plurality of bolt-receiving channels 3 comprises a channel body 36 and a connecting member slot 37. The channel body 36 is connected to the front side 13 of the main body 1, and the connecting member slot 37 traverses through the channel body 36 longitudinally opposite the front face along the channel body 36 for each of the plurality of bolt-receiving channels 3. The connecting member slot 37 traverses laterally along the channel body 36. Furthermore, the slot 37 is positioned on the first channel portion 34 for each of the plurality of bolt-receiving channels 3. The tie bar 52 is positioned external to the plurality of bolt-receiving channels 3, adjacent to the connecting member slot 37 of each of the plurality of bolt-receiving channels 3. Each of the plurality of bolt-connecting members 53 traverses through the connecting member slot 37 of one of the plurality of bolt-receiving channels 3, and each of the plurality of bolt-connecting members 53 is connected between one of the plurality of bolts 4 and the tie bar 52, such that the plurality of bolts 4 is laterally aligned with each other through the plurality of bolt-connecting members 53 and the tie bar 52. The tightening mechanism 5 functions to laterally displace the plurality of bolts 4 within the plurality of bolt-receiving channels 3. To do so, the plurality of bolts 4 are laterally aligned with each other through the tie bar 52 by the bolt-connecting members 53, which are laterally displaced along the slot 37 during adjustment.

Figure 6:
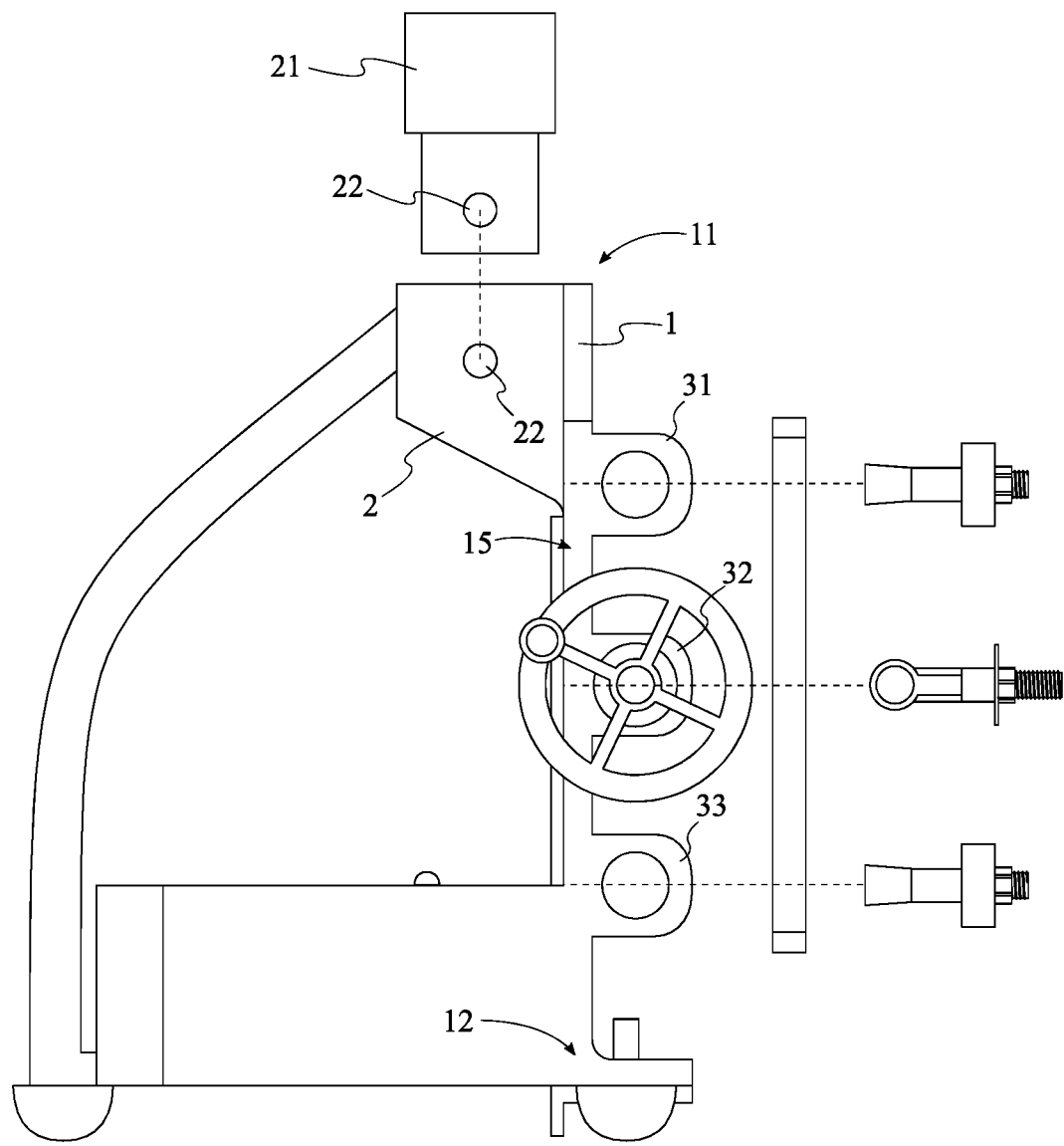
FIG. 6 is a side view of the present invention in the exploded state.

In the preferred embodiment of the present invention, the first wedge bolt 41 and the second wedge bolt 42 from the plurality of bolts 4 each comprise a lateral through hole 43, as seen in FIG. 5. Furthermore, the plurality of bolt-connecting members 53 comprises a first connecting bolt 54, a second connecting bolt 55, a first nut 56, and a second nut 57, as seen in FIGS. 2 and 6. The first connecting bolt 54 and the second connecting bolt 55 each comprise a tapered portion 58 and a threaded portion 59. The tapered portion 58 of the first connecting bolt 54 is affixed within the lateral through hole 43 of the first wedge bolt 41, and the tapered portion 58 of the second connecting bolt 55 is affixed within the lateral through hole 43 of the second wedge bolt 42. The threaded portion 59 of each of the first connecting bolt 54 and of the second connecting bolt 55 traverse through the tie bar 52. The first nut 56 is threadedly engaged with the threaded portion 59 of the first connecting bolt 54 adjacent to the tie bar 52, opposite the tapered portion 58 of the first connecting bolt 54, and the second nut 57 is threadedly engaged with the threaded portion 59 of the second connecting bolt 55 adjacent to the tie bar 52, opposite the tapered portion 58 of the second connecting bolt 55. Thus, the first wedge bolt 41 and the second wedge bolt 42 are laterally aligned with each other through the first connecting bolt 54, the second connecting bolt 55, the tie bar 52, the first nut 56, and the second nut 57. The first connecting bolt 54 and the second connecting bolt 55 traverse laterally along the slot 37 of the top bolt-receiving channel 31 and the slot 37 of the bottom bolt-receiving channel 33, respectively, while the tightening mechanism 5 is operated.

In the preferred embodiment of the present invention, the tightening mechanism 5 is operated by rotating the center bolt 51, which results in the first wedge bolt 41 and the second wedge bolt 42 being axially displaced. To do so, the center bolt 51 comprises a threaded portion 510, and the plurality of bolt-connecting members 53 further comprises an adjustment member 531 comprising a threaded collar 532 and a connecting portion 533. The threaded collar 532 is concentrically positioned and threadedly engaged with the threaded portion 510 of the center bolt 51, wherein the threaded collar 532 is positioned within and oriented axially parallel to the center bolt 51-receiving channel 32. The connecting portion 533 of the adjustment member 531 is perpendicularly connected adjacent to the threaded collar 532, and the connecting portion 533 is affixed to the tie bar 52, such that the threaded collar 532 and the tie bar 52 are laterally aligned through the connecting portion 533 of the adjustment member 531. Thus, as the center bolt 51 is axially rotated within the center bolt 51-receiving channel 32, the threaded collar 532 is axially displaced along the length of the center bolt 51 through the threaded connection between the threaded collar 532 and the threaded portion 510 of the center bolt 51. As the threaded collar 532 is displaced, so is the connecting portion 533 of the adjustment member 531, and so in turn is the tie bar 52, and so in turn are the first wedge bolt 41 and the second wedge bolt 42 axially displaced.

In various embodiments, the center bolt 51 may be axially rotated through any suitable means. In some embodiments, the tightening mechanism 5 further comprises a wheel 500 rotatably coupled to the center bolt 51 and positioned adjacent to the first lateral side 15. Thus, a user may simply turn the wheel 500 in order to turn the center bolt 51 and thus displace the plurality of bolts 4 in order to tighten the plurality of bolts 4 against a vertically-oriented rod placed within the rod channel 6, as illustrated in FIG. 8.

Additionally, in the preferred embodiment, the tightening mechanism 5 further comprises a bearing 502, as seen in FIG. 5. The bearing 502 is concentrically positioned within the center bolt 51-receiving channel 32 adjacent to the first lateral side 15, such that the center bolt 51 is rotatably and axially supported within the center bolt 51-receiving channel 32 by the bearing 502. Thus, the center bolt 51 is free to be rotated in order to adjust the lateral position of the first wedge bolt 41 and the second wedge bolt 42.

The preferred embodiment of the present invention further comprises a plurality of feet 120. The plurality of feet 120 may be made of rubber or another soft material that functions to support the rest of the present invention and mitigate vibration or impact from the bottom. In the preferred embodiment, the plurality of feet 120 comprises a first foot 121, a second foot 122, and a third foot 123. Moreover, the present invention may further comprise a bottom lip 130 that is positioned adjacent to the bottom end 12 of the main body 1 and perpendicularly connected to the front side 13 of the main body 1. As such, the first foot 121 and second foot 122 may be connected to the underside of the bottom lip 130 adjacent to the first lateral side 15 and the second lateral side 16, respectively, while the third foot 123 is connected adjacent to the underside of the retaining cuff 8, or support member 9 as desired, so that the plurality of feet 120 form a triangular base for the present invention to rest on.

Although the invention has been explained in relation to its preferred embodiment, it is to be understood that many other possible modifications and variations can be made without departing from the spirit and scope of the invention as hereinafter claimed.

What is claimed is:

1. An adjustable winch hanger comprising:
a main body;
a hanger connection;
a plurality of bolt-receiving channels;
a plurality of bolts;
a tightening mechanism;
a rod channel;
the main body extending vertically between a top end and a bottom end, longitudinally between a front side and a back side, and laterally between a first lateral side and a second lateral side;
the hanger connection being connected adjacent to the top end of the main body;
the plurality of bolt-receiving channels being connected to the front side of the main body;
each of the plurality of bolt-receiving channels being oriented laterally and parallel to each other;
the plurality of bolt-receiving channels being linearly distributed along the front side between the top end and the bottom end;
each of the plurality of bolts being positioned into one of the plurality of bolt-receiving channels adjacent to the first lateral side;
the tightening mechanism being engaged with the plurality of bolts, wherein the tightening mechanism is configured to axially displace the plurality of bolts within the plurality of bolt-receiving channels, and wherein the plurality of bolts is laterally aligned with each other through the tightening mechanism; and
the rod channel traversing vertically and centrally through the plurality of bolt-receiving channels adjacent to the front side.

2. The adjustable winch hanger as claimed in claim 1 comprising:
a retaining cuff;
the retaining cuff being connected to the back side of the main body adjacent to the bottom end;
the retaining cuff being connected between the first lateral side and the second lateral side; and
the retaining cuff extending longitudinally outward from the back side, wherein a retaining space is delineated between the retaining cuff and the main body.

3. The adjustable winch hanger as claimed in claim 2 comprising:
a support member;
the support member being connected between the retaining cuff and the hanger connection; and
the support member being laterally positioned equidistantly between the first lateral side and the second lateral side of the main body.

4. The adjustable winch hanger as claimed in claim 1 comprising:
the hanger connection being connected to the back side of the main body.

5. The adjustable winch hanger as claimed in claim 1 comprising:
an anchor insert;
the hanger connection comprising an insert recess;
the insert recess vertically traversing into the hanger connection; and
the anchor insert being removably affixed within the insert recess.

6. The adjustable winch hanger as claimed in claim 1 comprising:
the plurality of bolts comprising a first wedge bolt and a second wedge bolt;
the tightening mechanism comprising a center bolt;
the plurality of bolt-receiving channels comprising a top bolt-receiving channel, a center bolt-receiving channel, and a bottom bolt-receiving channel;
the first wedge bolt being positioned within the top bolt-receiving channel;
the center bolt being positioned within the center bolt-receiving channel; and
the second wedge bolt being positioned within the bottom bolt-receiving channel.

7. The adjustable winch hanger as claimed in claim 1 comprising:
each of the plurality of bolt-receiving channels comprising a first channel portion and a second channel portion;
the first channel portion being positioned adjacent to the first lateral side;

the second channel portion being positioned adjacent to the second lateral side; and the first channel portion and the second channel portion being laterally separated by the rod channel for each of the plurality of bolt-receiving channels.

8. The adjustable winch hanger as claimed in claim 1 comprising:

the tightening mechanism comprising a tie bar and a plurality of bolt-connecting members;

each of the plurality of bolt-receiving channels comprising a channel body and a connecting member slot;

the channel body being connected to the front side of the main body;

the connecting member slot traversing through the channel body longitudinally opposite the front face along the channel body for each of the plurality of bolt-receiving channels;

the connecting member slot traversing laterally along the channel body;

the tie bar being positioned external to the plurality of bolt-receiving channels, adjacent to the connecting member slot of each of the plurality of bolt-receiving channels;

each of the plurality of bolt-connecting members traversing through the connecting member slot of one of the plurality of bolt-receiving channels; and each of the plurality of bolt-connecting members being connected between one of the plurality of bolts and the tie bar, wherein the plurality of bolts is laterally aligned with each other through the plurality of bolt-connecting members and the tie bar.

9. The adjustable winch hanger as claimed in claim 8 comprising:

the slot being positioned on a first channel portion for each of the plurality of bolt-receiving channels.

10. The adjustable winch hanger as claimed in claim 8 comprising:

a first wedge bolt and a second wedge bolt from the plurality of bolts each comprising a lateral through hole;

the plurality of bolt-connecting members comprising a first connecting bolt, a second connecting bolt, a first nut, and a second nut;

the first connecting bolt and the second connecting bolt each comprising a tapered portion and a threaded portion;

the tapered portion of the first connecting bolt being affixed within the lateral through hole of the first wedge bolt;

the tapered portion of the second connecting bolt being affixed within the lateral through hole of the second wedge bolt;

the threaded portion of the first connecting bolt and the second connecting bolt traversing through the tie bar;

the first nut being threadedly engaged with the threaded portion of the first connecting bolt adjacent to the tie bar, opposite the tapered portion of the first connecting bolt; and the second nut being threadedly engaged with the threaded portion of the second connecting bolt adjacent to the tie bar, opposite the tapered portion of the second connecting bolt.

11. The adjustable winch hanger as claimed in claim 8 comprising:

a center bolt of the tightening mechanism comprising a threaded portion;

the plurality of bolt-connecting members further comprising an adjustment member;

the adjustment member comprising a threaded collar and a connecting portion;

the threaded collar being concentrically positioned and threadedly engaged with the threaded portion of the center bolt, wherein the threaded collar is positioned within and oriented axially parallel to a center bolt-receiving channel from the plurality of bolt-receiving channels;

the connecting portion of the adjustment member being perpendicularly connected adjacent to the threaded collar; and the connecting portion being affixed to the tie bar, wherein the threaded collar and the tie bar are laterally aligned through the connecting portion of the adjustment member.

12. The adjustable winch hanger as claimed in claim 1 comprising:

the rod channel being delineated by at least one circle.

13. The adjustable winch hanger as claimed in claim 12 comprising:

a first circle from the at least one circle being positioned tangent to the front side of the main body;

a second circle from the at least one circle being larger in diameter than the first circle; and a center of the first circle being positioned between a center of the second circle and the front side of the main body.

14. The adjustable winch hanger as claimed in claim 1 comprising:

the tightening mechanism comprising a wheel;

the wheel being rotatably coupled to a center bolt from the plurality of bolts; and the wheel being positioned adjacent to the first lateral side.

15. The adjustable winch hanger as claimed in claim 1 comprising:

the tightening mechanism comprising a bearing and a center bolt;

the bearing being concentrically positioned within a center bolt-receiving channel from the plurality of bolt-receiving channels adjacent to the first lateral side; and the center bolt being concentrically positioned with the bearing, wherein the center bolt is rotatably and axially supported within the center bolt-receiving channel by the bearing.

16. The adjustable winch hanger as claimed in claim 1 comprising:

a chain retaining barrier;

the chain retaining barrier being connected to the back side of the main body, adjacent to the bottom end;

the chain retaining barrier extending longitudinally outward from the back side of the main body, wherein a chain dropway is delineated between the chain retaining barrier and the main body; and the chain retaining barrier being laterally centered between the first lateral side and the second lateral side of the main body.

17. The adjustable winch hanger as claimed in claim 16 comprising:

a laser channel;

the laser channel being internally connected to the chain retaining barrier, longitudinally opposite the main body; and the laser channel being oriented vertically.

\* \* \* \* \*